United States Patent
Matsumoto et al.

(10) Patent No.: US 9,130,202 B2
(45) Date of Patent: Sep. 8, 2015

(54) METHOD FOR CONTROLLING FUEL CELL SYSTEM WITH IN-STOP-MODE POWER GENERATING PROCESS AND STARTUP PROCESS

(75) Inventors: Yuji Matsumoto, Wako (JP); Chihiro Wake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 708 days.

(21) Appl. No.: 13/423,276

(22) Filed: Mar. 19, 2012

(65) Prior Publication Data

US 2012/0251910 A1    Oct. 4, 2012

(30) Foreign Application Priority Data

Mar. 31, 2011    (JP) .................... 2011-078451

(51) Int. Cl.
*H01M 8/04*    (2006.01)
(52) U.S. Cl.
CPC *H01M 8/04* (2013.01); *Y02E 60/50* (2013.01); *Y02E 60/521* (2013.01)
(58) Field of Classification Search
None
See application file for complete search history.

(56) References Cited

U.S. PATENT DOCUMENTS

| | | | |
|---|---|---|---|
| 8,691,460 B2* | 4/2014 | Matsumoto et al. | 429/429 |
| 2006/0088742 A1* | 4/2006 | Kotani et al. | 429/13 |
| 2007/0092771 A1* | 4/2007 | Wake et al. | 429/22 |
| 2008/0187791 A1* | 8/2008 | Matsumoto et al. | 429/13 |
| 2010/0009219 A1* | 1/2010 | Kwon et al. | 429/13 |

FOREIGN PATENT DOCUMENTS

JP    2004-022487    1/2004

* cited by examiner

*Primary Examiner* — Patrick Ryan
*Assistant Examiner* — Lucas J O'Donnell
(74) *Attorney, Agent, or Firm* — Mori & Ward, LLP

(57) ABSTRACT

A method includes an in-stop-mode power generating process and a first startup process. In the a first startup process, if an operation start instruction to start a fuel cell system is detected after the in-stop-mode power generating process, supply of a fuel gas from a fuel-gas supply apparatus is started, and supply of an oxide gas from an oxide-gas supply apparatus is started after a predetermined time has elapsed from the starting of supply of the fuel gas, when a pressure of an anode side is equal to or lower than a first threshold pressure.

14 Claims, 11 Drawing Sheets

METHOD FOR CONTROLLING FUEL CELL SYSTEM WITH IN-STOP-MODE POWER GENERATING PROCESS AND STARTUP PROCESS

CROSS-REFERENCE TO RELATED APPLICATIONS

The present application claims priority under 35 U.S.C. §119 to Japanese Patent Application No. 2011-078451, filed Mar. 31, 2011, entitled "Startup Control Method For Fuel Cell System." The contents of this application are incorporated herein by reference in their entirety.

BACKGROUND OF THE INVENTION

1. Field of the Invention

The present invention relates to a method for controlling a fuel cell system.

2. Discussion of the Background

A fuel cell system acquires DC electric energy according to an electrochemical reaction of a fuel gas (gas essentially containing hydrogen, such as hydrogen gas) and an oxide gas (gas essentially containing oxygen, such as air) respectively supplied to an anode electrode and a cathode electrode. This system is of a stationary type, or is mounted in a fuel cell vehicle as an on-vehicle fuel cell system.

For example, a solid polymer fuel cell has an electrolyte membrane/electrode assembly (MEA) having an anode electrode and a cathode electrode provided on the respective side of an electrolyte membrane formed by a polymer ion-exchange film; the electrolyte membrane/electrode assembly is sandwiched by a pair of separators. A fuel gas passage for supplying a fuel gas to the anode electrode is formed between one of the separators and the electrolyte membrane/electrode assembly. An oxide gas passage for supplying an oxide gas to the cathode electrode is formed between the other separator and the electrolyte membrane/electrode assembly.

When the fuel cell is stopped, supply of the fuel gas and oxide gas is stopped. However, the fuel gas remains in the fuel gas passage, and the oxide gas remains in the oxide gas passage. When the operation-stop period of the fuel cell becomes long, therefore, the fuel gas and the oxide gas may pass through the electrolyte membrane, so that the fuel gas is mixed with the oxide gas to react therewith, thereby deteriorating the electrolyte membrane/electrode assembly.

To cope with the problem, a fuel cell system disclosed in, for example, Japanese Unexamined Patent Application Publication No. 2004-22487 (FIG. 1 and paragraph [0029]) shuts off the supply of a reaction gas to the anode side, and shuts off the supply of the reaction gas to the cathode side from a blower (air pump) when the operation of the fuel cell is stopped. Further, the exhaust gas on the anode side is circulated to the upstream side through an anode-side circulation line, and the exhaust gas on the cathode side is circulated to the upstream side through a cathode-side circulation line, so that an electrochemical reaction in the fuel cell is maintained to thereby charge the battery with the generated power. Further, hydrogen in the exhaust gas on the anode side is consumed and oxygen in the exhaust gas on the cathode side is consumed this way, and a nitrogen gas is stored in a tank. The gases in the anode and cathode of the fuel cell are replaced with the nitrogen gas stored in the tank.

The replacement of the gases in the anode and cathode of a fuel cell with an inactive gas like the nitrogen gas when the operation of the fuel cell is stopped as done according to the technique described in Japanese Unexamined Patent Application Publication No. 2004-22487 reduces the possibility of causing an unnecessary reaction after the operation is stopped. This effect is preferable from the viewpoint of preventing degradation of the fuel cell.

However, the fuel cell system disclosed in Japanese Unexamined Patent Application Publication No. 2004-22487 needs the cathode-side circulation line, the tank to store a nitrogen gas, and a line for supplying the nitrogen gas to the anode side, which complicates the configuration of the fuel cell system and makes the fuel cell system expensive.

As a possible solution to this problem, the operation of the fuel cell may be stopped in such a way that supply of the fuel gas to the anode side is shut off, and the amount of air supplied to the cathode side is reduced to maintain power generation so that the cathode side is filled with nitrogen.

When such a process with the operation of the fuel cell stopped is executed, the anode side is kept airtight with negative pressure increased. Since the cathode side communicates with the atmosphere via the air pump, the pressure on the cathode side becomes atmospheric pressure (0 kPg). During soaking, therefore, an inter-electrode differential pressure between the anode and the cathode becomes large.

In the fuel cell system, an air inlet passage is provided between a fuel-gas inlet hole on the anode side and the outlet side of the air pump with an air inlet valve disposed in the air inlet passage to blow off (scavenge) water or the like staying on the anode side out of the fuel cell stack when, for example, the outside temperature is likely to fall below the freezing point during soaking.

In this case, a large-capacity discharge valve is provided in parallel to a purge valve between an off-gas passage communicating with a fuel-gas outlet hole on the anode side and the entrance of a dilution box. In executing the scavenging process (referred to as "anode scavenging process" or "anode-air scavenging process"), the air inlet valve is opened, and the discharge valve (purge valve if needed) is opened to let compressed air from the air pump flow into the dilution box through the air inlet valve, the anode in the fuel cell and the discharge valve (purge valve). The outlet side of the dilution box communicates with the atmosphere. Blowing liquid droplets or the like on the anode side this way prevents freezing on the anode side.

A normally-closed on-off solenoid valve (which (or whose valve body) is closed when not energized) which (or whose valve body) is closed by elastic force and is opened by electromagnetic force is used for the foregoing air inlet valve, purge valve and discharge valve.

Therefore, the aforementioned large inter-electrode differential pressure is applied to the air inlet valve, purge valve and discharge valve before the anode scavenging process is executed at the time of soaking after the operation of the fuel cell system is stopped.

At the time the fuel cell system according to the related art is started, as illustrated in a timing chart in FIG. 12, when the ignition switch (operation switch) is set on (IG ON), the air pump is driven to supply the oxide gas to the cathode, and when a time Ts during which the cathode pressure rises to a predetermined pressure Pd according to an increase in the number of rotations of the air pump elapses, the hydrogen shutoff valve is opened to supply a high-pressure fuel gas.

SUMMARY OF THE INVENTION

According to one aspect of the present invention, a method is for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell. The method includes: an in-stop-mode power generating process of, if an operation stop instruction to stop an operation of the fuel cell is detected, stopping supply of the fuel gas, supplying the oxide gas to the fuel cell to generate power from the oxide-gas supply apparatus, and stopping power generation of the fuel cell; and a first startup process of, if an operation start instruction to start the fuel cell system is detected after the in-stop-mode power generating process, starting supplying the fuel gas from the fuel-gas supply apparatus, and starting supplying the oxide gas from the oxide-gas supply apparatus after a predetermined time has elapsed from the starting of supply of the fuel gas, when a pressure of the anode side is equal to or lower than a first threshold pressure.

According to another aspect of the present invention, a method is for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell. The method includes: an in-stop-mode power generating process of, if an operation stop instruction to stop an operation of the fuel cell is detected, stopping supply of the fuel gas, supplying the oxide gas to the fuel cell to generate power from the oxide-gas supply apparatus, and stopping power generation of the fuel cell; and a second startup process of, if an operation start instruction to start the fuel cell system is detected after the in-stop-mode power generating process, starting supplying the fuel gas from the fuel-gas supply apparatus before starting supplying the oxide gas from the oxide-gas supply apparatus, and starting supplying the oxide gas after a predetermined time has elapsed from the starting of supply of the fuel gas, in a case where a pressure of the anode side when the power generation of the fuel cell is stopped is equal to or lower than a second threshold pressure and a time elapsed since stopping of power generation of the fuel cell lies within a specified time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
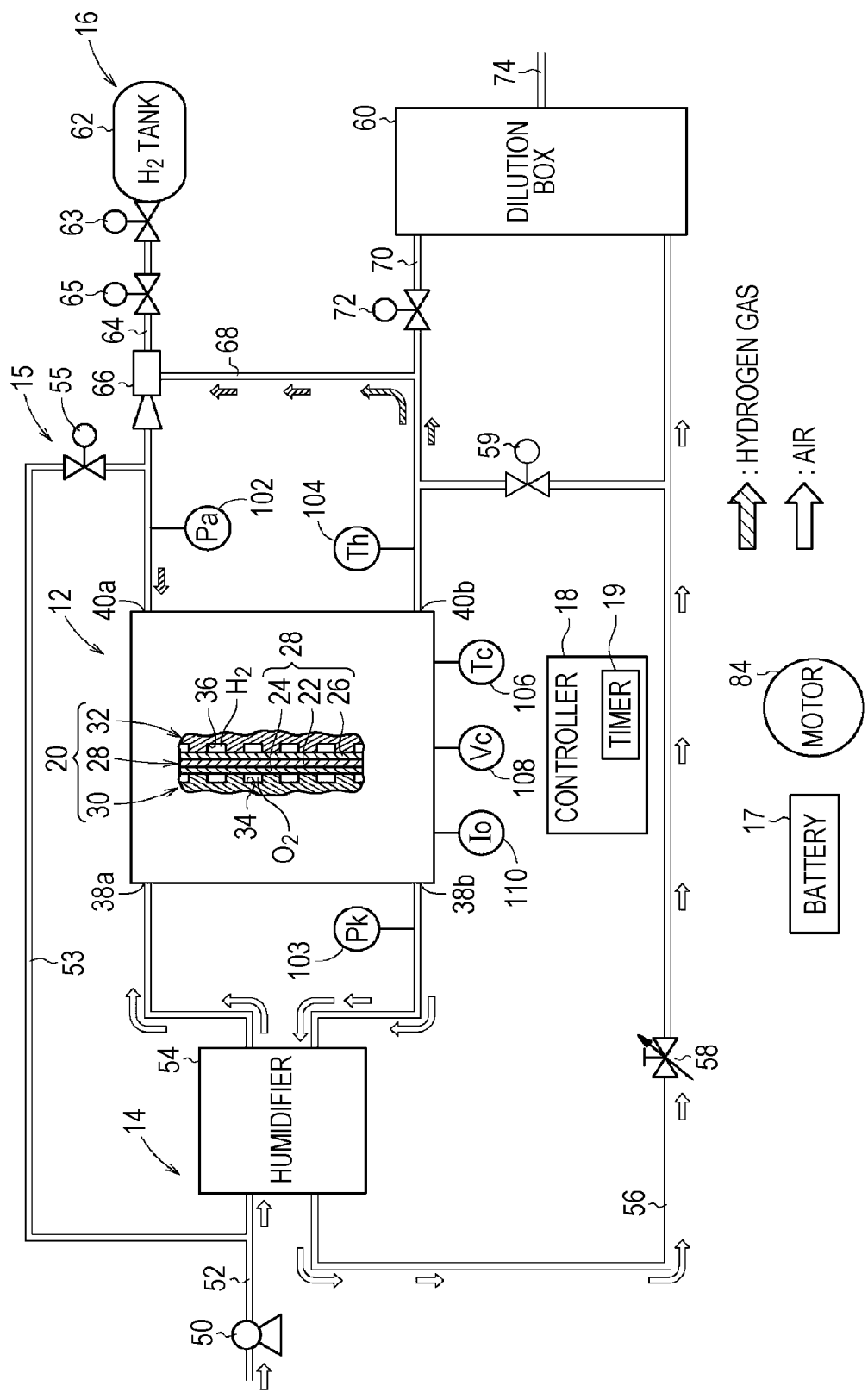
FIG. 1 is a schematic configurational diagram of a fuel cell system which is a target of an operation stopping method according to an exemplary embodiment of the disclosure.

The embodiments will now be described with reference to the accompanying drawings, wherein like reference numerals designate corresponding or identical elements throughout the various drawings.

As shown in FIG. 1, a fuel cell system 10 which is a target of an operation stopping method according to an exemplary embodiment of the disclosure includes a fuel cell stack 12, an oxide-gas supply apparatus 14 that supplies an oxide gas to the fuel cell stack 12, an anode scavenging apparatus 15 that supplies a replacement gas to the fuel cell stack 12, a fuel-gas supply apparatus 16 that supplies a fuel gas to the fuel cell stack 12, a battery (electric storage device) 17 connectable to the fuel cell stack 12, and a controller (control apparatus, control unit) 18 that performs the general control of the fuel cell system 10.

The controller 18 is a computer including a microcomputer, and has a CPU (Central Processing Unit), a ROM (including EEPROM) as a memory, a RAM (Random Access Memory), input/output units, such as an A/D converter and a D/A converter, and a timer 19 serving as a clock or time-measuring unit. When the CPU reads a program stored in the ROM and executes it, the controller 18 functions as various functional parts, such as a control unit, an arithmetic operation unit, and a processing unit.

The fuel cell system 10 is mounted in a fuel cell vehicle like a fuel cell car. The battery 17 permits the fuel cell vehicle to run normally, and has a capacity of 20 A and as high as about 500 V, a higher voltage and higher capacity than a 12-V power supply 98 to be described later.

The fuel cell stack 12 has a stack of a plurality of fuel cells (also called "cells" or "cell pairs") 20. Each fuel cell 20 includes an electrolyte membrane/electrode assembly (MEA) 28 which has a solid polymer electrolyte membrane 22 sandwiched between a cathode electrode 24 and an anode electrode 26. The solid polymer electrolyte membrane 22 is formed by a thin film of perfluorosulfone impregnated with water.

The cathode electrode 24 and the anode electrode 26 each have a gas diffusion layer formed by carbon paper or the like, and an electrode catalyst layer formed by applying porous carbon particles each carrying a platinum alloy (or Ru or the like) on its surface to the surface of the gas diffusion layer uniformly. The electrode catalyst layer is formed on both sides of the solid polymer electrolyte membrane 22.

The electrolyte membrane/electrode assembly 28 is sandwiched by a cathode-side separator 30 and an anode-side separator 32. The cathode-side separator 30 and anode-side separator 32 are made of, for example, carbon or a metal.

An oxide gas passage 34 is provided between the cathode-side separator 30 and the electrolyte membrane/electrode assembly 28. A fuel gas passage 36 is provided between the anode-side separator 32 and the electrolyte membrane/electrode assembly 28.

The fuel cell stack 12 provided with an oxide-gas inlet hole 38a for supplying an oxide gas, e.g., an oxygen-containing gas (hereinafter also referred to as "air"), a fuel-gas inlet hole 40a for supplying a fuel gas, e.g., a hydrogen-containing gas (hereinafter also referred to as "hydrogen gas"), a coolant inlet hole (not shown) for supplying a coolant, an oxide-gas outlet hole 38b for discharging the oxide gas, a fuel-gas outlet hole 40b for discharging the fuel gas, and a coolant outlet hole (not shown) for discharging the coolant. The oxide-gas inlet hole 38a, the fuel-gas inlet hole 40a, the coolant inlet hole, the oxide-gas outlet hole 38b, the fuel-gas outlet hole 40b, and the coolant outlet hole communicate with one another in the stack direction of the fuel cells 20.

The oxide-gas supply apparatus 14 includes an air pump 50 that compresses atmospheric air and supplies it. The air pump 50 is disposed in an air supply passage 52. A humidifier 54 that exchanges moisture and heat between a supplied gas and an exhaust gas is disposed in the air supply passage 52. The air supply passage 52 communicates with the oxide-gas inlet hole 38a of the fuel cell stack 12.

The oxide-gas supply apparatus 14 further includes an air discharge passage 56 communicating with the oxide-gas outlet hole 38b. The air discharge passage 56 communicates with the a humidifying-medium passage (not shown) of the humidifier 54. The air discharge passage 56 is provided with a back-pressure control valve (hereinafter also referred to simple as "back pressure valve") 58 whose degree of opening is adjustable, such as a butterfly valve, to adjust the pressure of air supplied to the fuel cell stack 12 from the air pump 50 via the air supply passage 52. The back-pressure control valve 58 is preferably a normally-closed control valve (which is closed when not energized). The air discharge passage 56 communicates with a dilution box 60.

The anode scavenging apparatus 15 includes the air pump 50, which is shared with the oxide-gas supply apparatus 14, an air inlet passage 53 provided between a hydrogen supply passage 64 downstream of an ejector 66 and the air supply passage 52, an air inlet valve 55 disposed in the air inlet passage 53, and a discharge valve 59 disposed between the off-gas passage 70 for the fuel gas and the air discharge passage 56.

The air inlet valve 55 is an on-off valve which is opened at the time of what is called an anode-side air scavenging process (referred to as "anode scavenging process") in order to supply compressed air from the air pump 50 to the fuel gas passage 36 through the fuel-gas inlet hole 40a via the air supply passage 52 and the air inlet passage 53. The discharge valve 59 is an on-off valve which is opened at the same time as this anode scavenging process is executed.

The fuel-gas supply apparatus 16 includes a hydrogen tank 62 that stores high-pressure hydrogen and is integrally provided with an in-tank solenoid valve 63 which is an on-off valve. The hydrogen tank 62 communicates with the fuel-gas inlet hole 40a of the fuel cell stack 12 via the hydrogen supply passage 64.

The hydrogen supply passage 64 is provided with a shutoff valve 65 which is an on-off valve, and the ejector 66. The ejector 66 supplies the hydrogen gas supplied from the hydrogen tank 62 to the fuel cell stack 12 through the hydrogen supply passage 64, and sucks an exhaust gas containing an unused hydrogen gas, which has not been used in the fuel cell stack 12, from a hydrogen circulation path 68 and supplies the exhaust gas to the fuel cell stack 12 again as a fuel gas.

An off-gas passage 70 communicates with the fuel-gas outlet hole 40b. The hydrogen circulation path 68 communicates with a halfway portion of the off-gas passage 70, which is connected with the dilution box 60 via a purge valve 72. The outlet side of the dilution box 60 is connected with a discharge passage 74. The discharge passage 74 is provided with a storage buffer (not shown) to which an exhaust passage communicating with the atmosphere is connected.

The aforementioned air inlet valve 55, discharge valve 59 and purge valve 72 differ from each other in capacity, but are common in configuration. The configuration (structure) of the air inlet valve 55 as a representative example will be described below.

Figure 3:
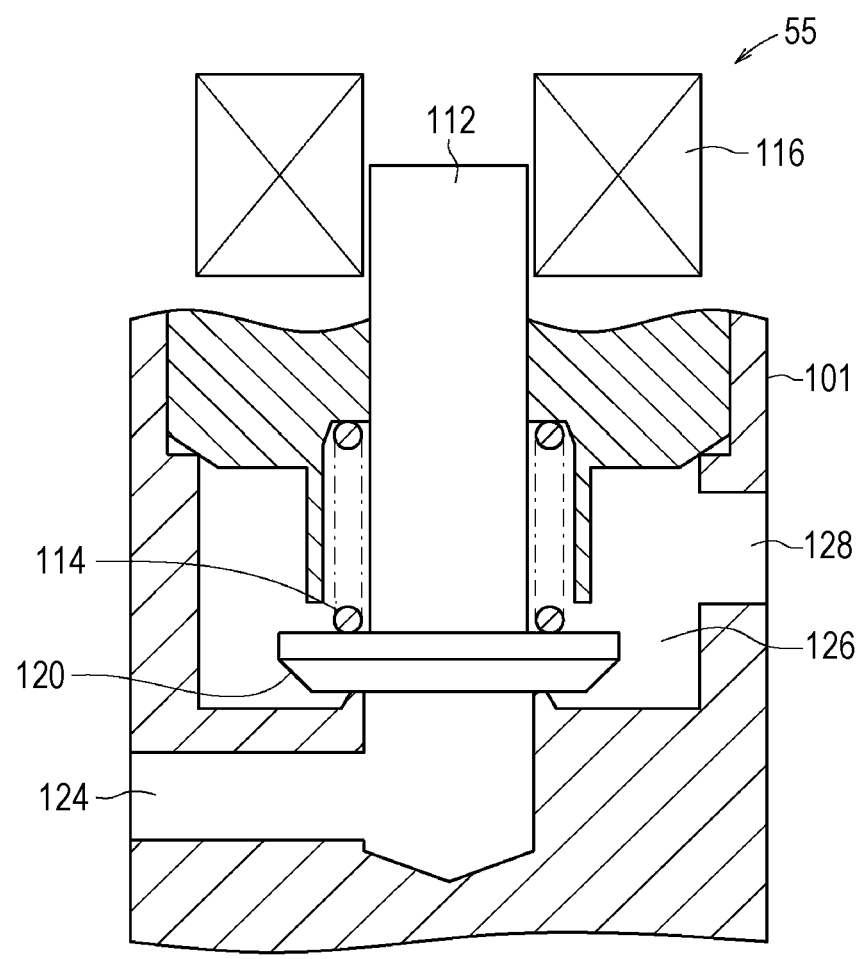
FIG. 3 is a cross-sectional view of the essential portions of an air inlet valve.

FIG. 3 shows the essential portions of the air inlet valve 55. The air inlet valve 55 includes a body 101, a port (input port) 124 communicating with the air pump 50, a valve chamber 126 communicating with the port 124, a port (output port) 128 communicating with the fuel-gas inlet hole 40a, a valve body 120 which connects the port 124 and the port 128 with each other or disconnects the port 124 and the port 128 from each other, a plunger 112 having the valve body 120 formed as a flange, a spring 114 provided between the body 101 and the plunger 112, and a solenoid coil 116.

In a closed state shown in FIG. 3, the valve body 120 is urged in a valve closing direction via the plunger 112 by the elastic force of the spring 114 to shut off the port 124 from the port 128. The electromagnetic force which is generated by energization of the solenoid coil 116 causes the plunger 112 to move upward in FIG. 3 against the elastic force of the spring 114, moving the valve body 120 in a valve opening direction, so that the port 124 and the port 128 communicate with each other (valve-open state).

The controller 18 acquires signals from a pressure sensor 102 provided in the hydrogen supply passage 64, a pressure sensor 103 provided in the vicinity of the oxide-gas outlet hole 38b, a temperature sensor 104 provided in the vicinity of the fuel-gas outlet hole 40b, a temperature sensor 106 provided in the coolant inlet hole (not shown), a voltage sensor 108, and a current sensor 110, and controls the ON (closing) and OFF (opening) actions of an FC contactor 86 to be described later, the opening/closing of and the degrees of opening of valves such as the shutoff valve 65, and controls an actuator for, for example, regulating the flow rate (airflow rate) of the air pump 50, based on the acquired signals. The pressure sensor 102 detects an anode pressure Pa. The pressure sensor 103 detects a cathode pressure Pk. The temperature sensor 104 detects a hydrogen temperature Th. The temperature sensor 106 detects a coolant temperature Tc. The voltage sensor 108 detects the voltage of each fuel cell 20 (called "cell voltage" or "cell pair voltage"). The current sensor 110 detects a current value Io of the current flowing out from the fuel cell stack 12.

Figure 2:
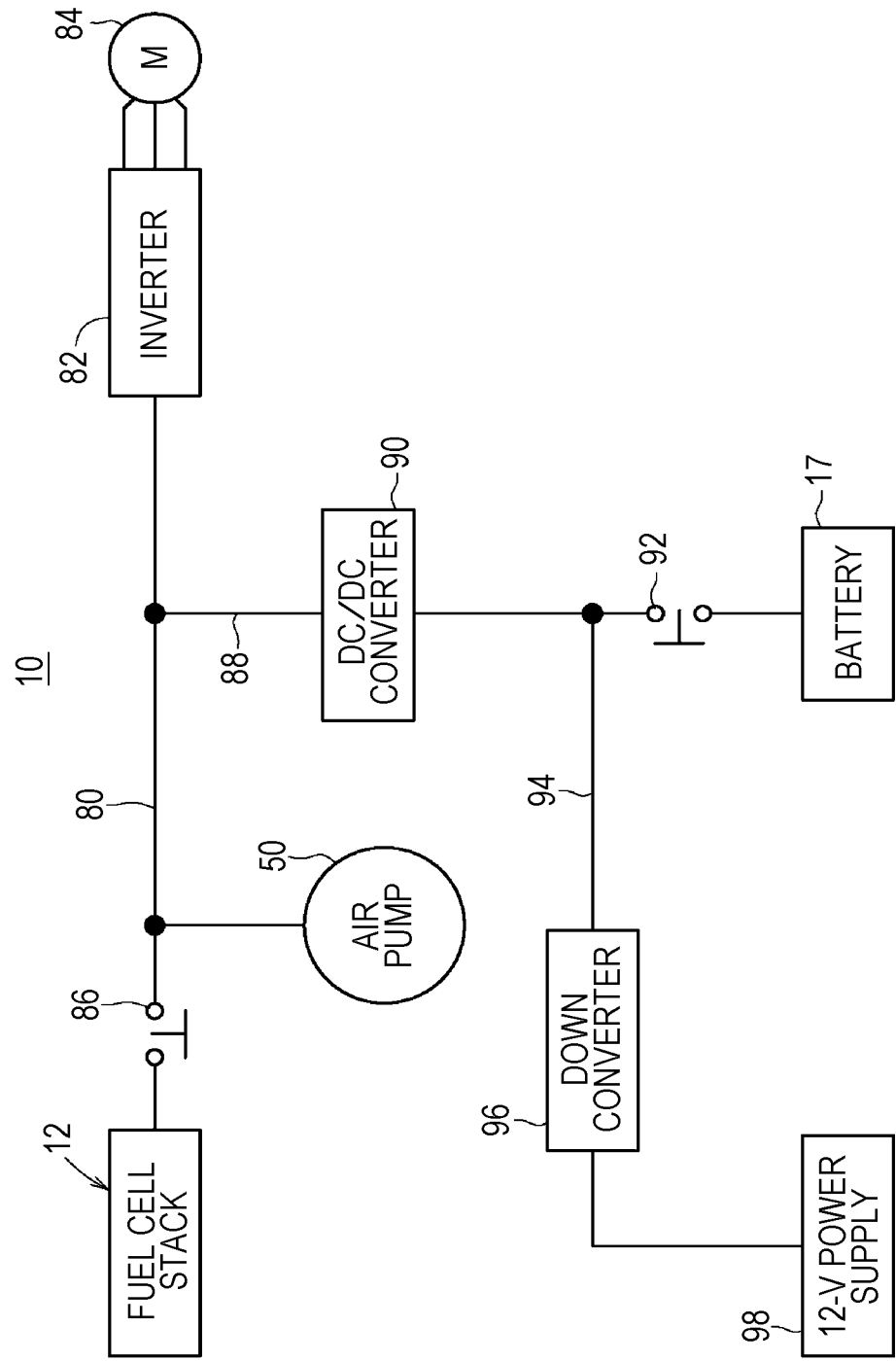
FIG. 2 is an explanatory diagram of circuits included in the fuel cell system.

As shown in FIG. 2, the fuel cell stack 12 is connected with one end of a main power line 80 whose other end is connected to an inverter 82. The inverter 82 is connected with a three-phase drive motor 84 for driving a vehicle. Substantially, two main power lines 80 are used, but are described as a single main power line 80 for the sake of descriptive convenience. The same is applied to other lines to be described hereinafter.

The main power line 80 is provided with the FC contactor (main-power-supply ON/OFF unit, fuel cell stack ON/OFF unit) 86, and is connected with the air pump 50. The main power line 80 is connected with one end of a power line 88 to which the battery 17 is connected via a DC/DC converter 90 and a battery contactor (electric-storage-unit ON/OFF unit) 92. The power line 88 is provided with a branched power line 94 to which the 12-V power supply 98 is connected via a down converter (DC/DC converter) 96. The voltage of the 12-V power supply 98 has only to be lower than the voltage of the battery 17, and is not limited to 12 V.

The operation of the fuel cell system 10 with the foregoing configuration will be described below.

First, at the time of the normal operation of the fuel cell system 10 (also referred to as "at the time of normal power generation" or "at the time of a normal power generating process"), air is supplied to the air supply passage 52 via the air pump 50 included in the oxide-gas supply apparatus 14. The air is humidified through the humidifier 54, and is supplied to the oxide-gas inlet hole 38a of the fuel cell stack 12. The air moves along the oxide gas passage 34, provided in each fuel cell 20 in the fuel cell stack 12, to be supplied to the cathode electrode 24.

The used air is discharged into the air discharge passage 56 from the oxide-gas outlet hole 38b, and is supplied to the humidifier 54 to humidify air newly supplied. The air is then supplied to the dilution box 60 via the back pressure valve 58.

When the in-tank solenoid valve 63 and the shutoff valve 65 in the fuel-gas supply apparatus 16 are opened, the hydrogen gas from the hydrogen tank 62 is depressurized by a depressurization control valve (not shown), and is then supplied to the hydrogen supply passage 64. The hydrogen gas is supplied to the fuel-gas inlet hole 40a of the fuel cell stack 12 through the hydrogen supply passage 64. The hydrogen gas supplied into the fuel cell stack 12 moves along the fuel gas passage 36 of each fuel cell 20 to be supplied to the anode electrode 26.

The used hydrogen gas is sucked by the ejector 66 from the fuel-gas outlet hole 40b via the hydrogen circulation path 68, and is supplied to the fuel cell stack 12 again as a fuel gas. Therefore, the air supplied to the cathode electrode 24 electrochemically reacts with the hydrogen gas supplied to the anode electrode 26 to generate power.

An impurity is likely to be mixed in the hydrogen gas that circulates in the hydrogen circulation path 68. Accordingly, the impurity-containing hydrogen gas is supplied to the dilution box 60 via the purge valve 72 opened. This hydrogen gas is mixed with an air-off gas in the dilution box 60 to reduce the hydrogen concentration, and is then discharged into the storage buffer (not shown).

During normal power generation, the anode scavenging apparatus 15 is not activated, and the air inlet valve 55 is kept closed. The air inlet valve 55 is a normally closed on-off valve (which is closed when not energized).

Next, the operation of the fuel cell system 10 at the time of stopping the operation of the fuel cell system 10 will be described below referring to a timing chart illustrated in FIG. 4.

The fuel cell system 10 mounted in a fuel cell vehicle (not shown) executes the normal power generation in the foregoing manner, the vehicle runs desirably. When an unillustrated ignition switch (operation switch) is set off, the controller 18 detects the turn-off action as a stop instruction (time t1), and initiates the operation stopping process for the fuel cell system 10.

First, after a discharge process (also referred to as "low-oxygen stoichiometric power generating process", "in-stop-mode power generating process", "$O_2$ lean process" or "$O_2$ lean power generating process") to be described later, the supply pressure of the hydrogen gas (fuel gas) is set beforehand so that the fuel-gas pressure (anode pressure Pa) in the fuel cell stack 12 is kept at a set pressure.

At the time of the discharge process, air is supplied with an oxygen stoichiometric ratio lower than the oxygen stoichiometric ratio in normal power generation mode.

Specifically, the low oxygen stoichiometric ratio is set around a value of 1. It is preferable that the oxygen stoichiometric ratio should fall between 1.2 to 3.0 in normal power generation mode. The supply of the hydrogen gas is stopped at the time of the discharge process. An anode pressure Pa1 is set so as to be kept at or higher than a constant pressure Pa2 when discharging is completed. The constant pressure Pa2 has a level which does not cause deficiency or shortage of hydrogen.

Figure 4:
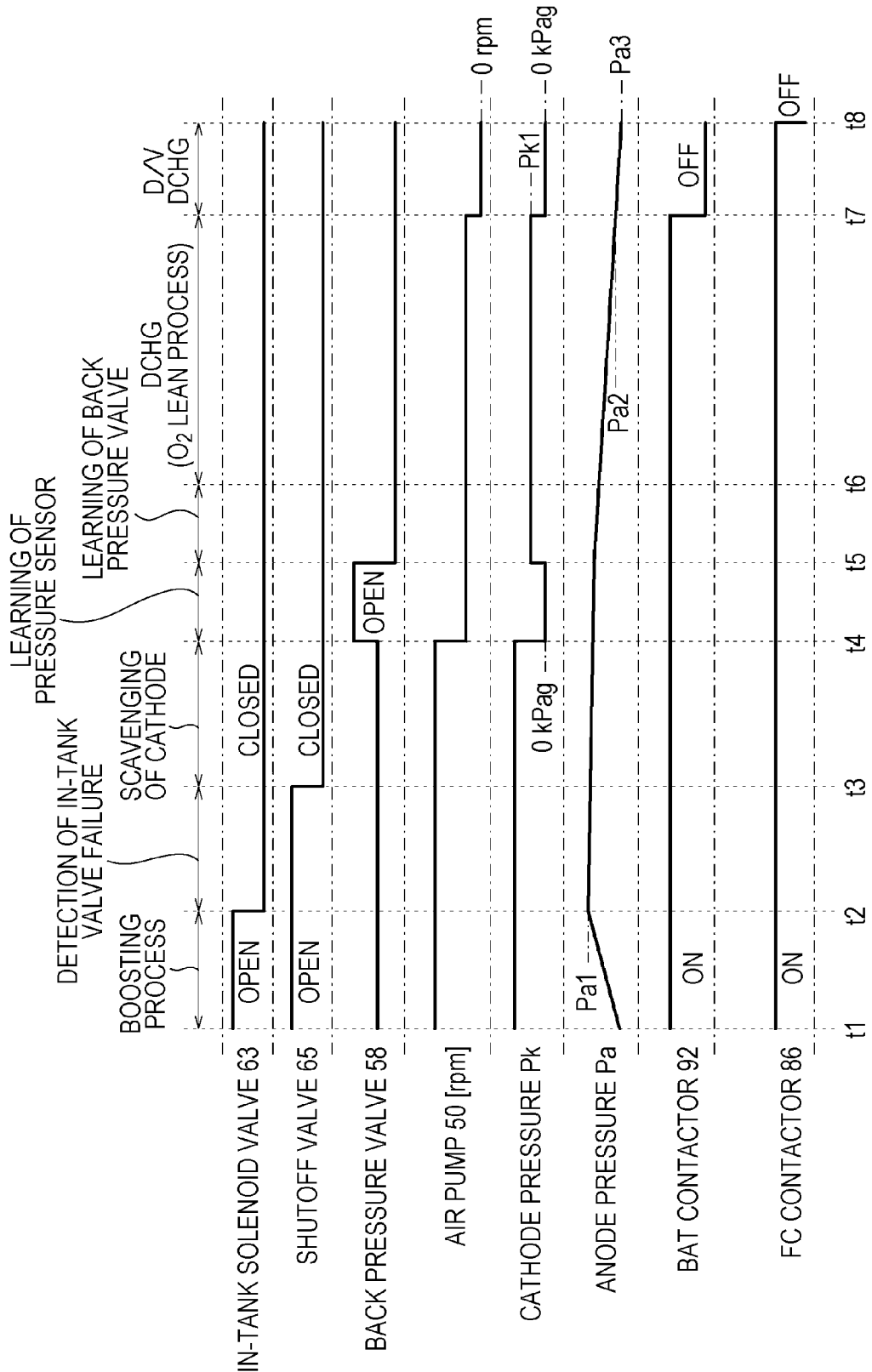
FIG. 4 is a timing chart used to explain the operation of the fuel cell system when the operation of the fuel cell system is stopped.

When the ignition switch (operation switch) is set off (time t1), as shown in FIG. 4, the hydrogen gas is supplied to the fuel cell stack 12 with the in-tank solenoid valve 63 and the shutoff valve 65 being opened, so that the pressure in the fuel cell stack 12 rises to the anode pressure Pa1 (times t1 to t2: boosting process).

When the boosting process is terminated (time t2), the in-tank solenoid valve 63 is closed, and the processing shifts to a process of detecting a failure of the in-tank solenoid valve 63. In the failure detecting process, a failure in the in-tank solenoid valve 63 is detected according to the present/absence of a change in pressure directly below the in-tank solenoid valve 63. When the pressure drops, the in-tank solenoid valve 63 is regarded as normal. That is, it is determined that the in-tank solenoid valve 63 is closed properly.

When the failure detecting process for the in-tank solenoid valve 63 is terminated (time t3), a cathode scavenging process is executed. In the cathode scavenging process, a scavenging process based on air (using the oxide-gas supply apparatus 14) is performed to blow off liquid droplets or the like containing water droplets on the cathode side and completely dilute hydrogen remaining in the dilution box 60. In this process, power insufficient to drive the air pump 50 which is set to have a high number of rotations [rpm] is supplemented (times t4 to t5).

After the cathode scavenging process, control on the degree of opening of the back pressure valve 58 is temporarily stopped to permit the cathode side to communicate with the atmosphere, thus creating the state where the cathode pressure Pk is set to PK=0 [kPag] where g means the gauge pressure (times t4 to t5). Further, when the cathode scavenging process is terminated (time t4), the number of rotations of the air pump 50 included in the oxide-gas supply apparatus 14 is reduced considerably as compared with that in normal operation mode, so that the oxide gas is supplied to with the oxygen stoichiometric ratio being lower than the oxygen stoichiometric ratio in normal operation mode. Specifically, the oxygen stoichiometric ratio is preferably set around 1. Then, a learning process (compensation for 0 point) for the pressure sensor 103 is executed.

Thereafter, the degree of opening of the back pressure valve 58 is adjusted at times t5 to t8 to set the cathode pressure Pk detected by the pressure sensor 103 to a predetermined low pressure Pk1 corresponding to the low oxygen stoichiometric ratio, and a learning process for the back pressure valve 58 at the low pressure Pk1 is executed (times t5 to t6). Thereafter, the cathode pressure Pk is kept set at the low pressure Pk1 until the air pump 50 is turned off (time t7).

Meanwhile, the fuel cell stack 12 keeps generating power (times t1 to t7).

In the low-oxygen stoichiometric power generating process (also referred to as "$O_2$ lean power generating process" or simply as "$O_2$ lean process"; times t5 to t6) after the learning process for the back pressure valve 58 (times t6 to t7), the current (FC current) to be acquired from the fuel cell stack 12 is set to a value which inhibits the hydrogen gas as the fuel gas from passing through the solid polymer electrolyte membrane 22 to move toward the cathode from the anode. At this time, the FC contactor 86 and the battery contactor 92 are set on in FIG. 2, and power obtained when the fuel cell stack 12 generates power is reduced by the DC/DC converter 90 to be charged in the battery 17.

As described above, while air with a low oxygen stoichiometric ratio is supplied to the fuel cell stack 12, the fuel cell stack 12 is generating power with supply of the hydrogen gas being stopped by the closure of the shutoff valve 65 (time t3). The purge valve 72 is also closed. The power generated by the fuel cell stack 12 is supplied to the battery 17 to be discharged (DCHG ($O_2$ lean process) in FIG. 4). When the power generated by the fuel cell stack 12 drops to a predetermined voltage, i.e., to a voltage which cannot be supplied to the battery 17 (substantially the same voltage as the voltage of the battery 17), therefore, the generated power is supplied only to the air pump 50.

Accordingly, while the hydrogen concentration on the anode side drops in the fuel cell stack 12 during the $O_2$ lean process (times t6 to t7), the oxygen concentration on the cathode side drops. Therefore, when the hydrogen pressure (anode pressure Pa) becomes equal to or lower than the predetermined pressure Pa2, for example, the air pump 50 is turned off, and the battery contactor 92 is set off (time t7).

Accordingly, the fuel cell stack 12 generates power according to the reaction of the hydrogen gas and air present inside the fuel cell stack 12 with each other (times t7 to t8). The power that is generated by the power generation of the fuel cell stack 12 is reduced via the down converter 96 to be charged in the 12-V power supply 98 (D/V DCHG in FIG. 4), and the power is supplied to a radiator fan or the like (not shown) as needed. Further, when the voltage generated by the fuel cell stack 12 drops down to near the operational limit voltage of the down converter 96, the FC contactor 86 is set off (time t8). As a result, the fuel cell system 10 goes to an operation stopped state or what is called a soaked state.

As described above, when the ignition switch is set off (time t1), the anode pressure Pa in the fuel cell stack 12 rises to the anode pressure Pa1 before supply of the hydrogen gas is stopped (time t2), and then the back pressure valve 58, the air pump 50, the in-tank solenoid valve 63 and the shutoff valve 65 are actuated. Therefore, the fuel cell stack 12 generates power according to the reaction of the hydrogen gas and air with a low-oxygen stoichiometric ratio, which remain inside the fuel cell stack 12, with each other, and the generated power is supplied to the battery 17 to be discharged (times t2 to t7).

Figure 5:
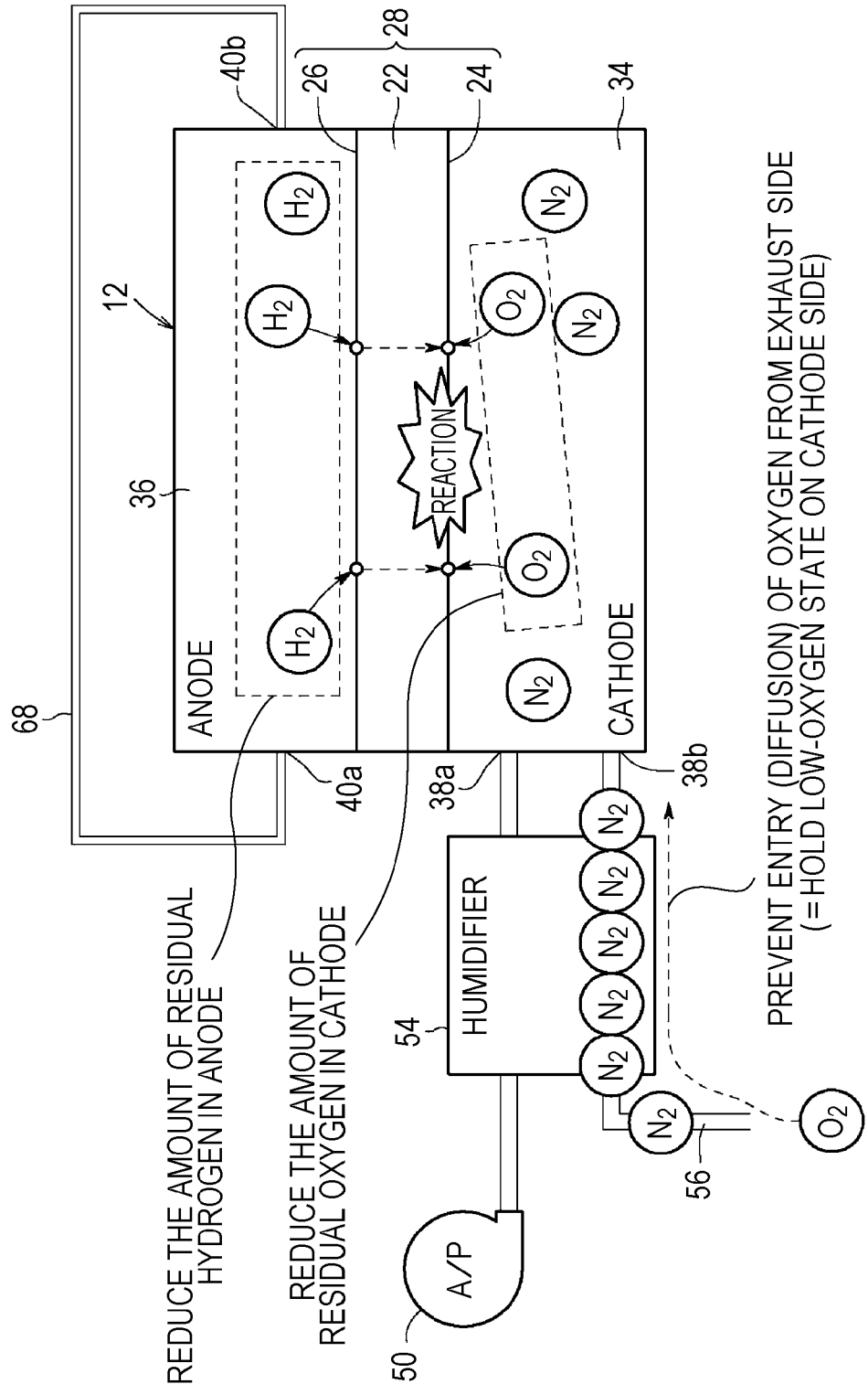
FIG. 5 is an explanatory diagram of an in-stop-mode power generating process.

As a result, as shown in FIG. 5 which exemplarily illustrates the operational effects of the in-stop-mode power generating process, the amount of residual hydrogen decreases on the anode side in the fuel cell stack 12 (the amount of residual hydrogen in the anode decreases in FIG. 5), reducing the hydrogen concentration, while the cathode side in a low-oxygen stoichiometric state, so that the oxygen concentration decreases, thus increasing the concentration of nitrogen $N_2$. As a consequence, entry (diffusion) of oxygen from the exhaust side (air discharge passage 56 side) is prevented, keeping the cathode side in a low-oxygen state.

In addition, the supply pressure of the hydrogen gas to be supplied to the fuel cell stack 12 is increased to the anode pressure Pa1 (time t2) before supply of the hydrogen gas is stopped. This can bring about an effect that low-oxygen stoichiometric power generation ($O_2$ lean process) is carried out properly with the fuel cell stack 12 being filled with an adequate amount of hydrogen, surely preventing an excessive hydrogen gas from remaining inside the fuel cell stack 12 or a hydrogen gas in the fuel cell stack 12 from running short, after discharging is completed.

Further, with the air pump 50 being stopped (time t7), the fuel cell stack 12 is caused to generate power according to a reaction of only hydrogen and oxygen remaining in the fuel cell stack 12 with each other (D/V DCHG in FIG. 4).

Therefore, the nitrogen-gas replacement range in the system is limited within the fuel cell stack 12 when the power generation of the fuel cell stack 12 is carried out while supplying air via the air pump 50, whereas the nitrogen-gas replacement range is expanded to the inlet side of the fuel cell stack 12 when the power generation of the fuel cell stack 12 is carried out after the air pump 50 is stopped (see FIG. 5). This brings about an advantage that even when the fuel cell system 10 is stopped for a comparatively long period of time, deterioration of the fuel cells 20 on the cathode side can be prevented as much as possible.

Figure 6:
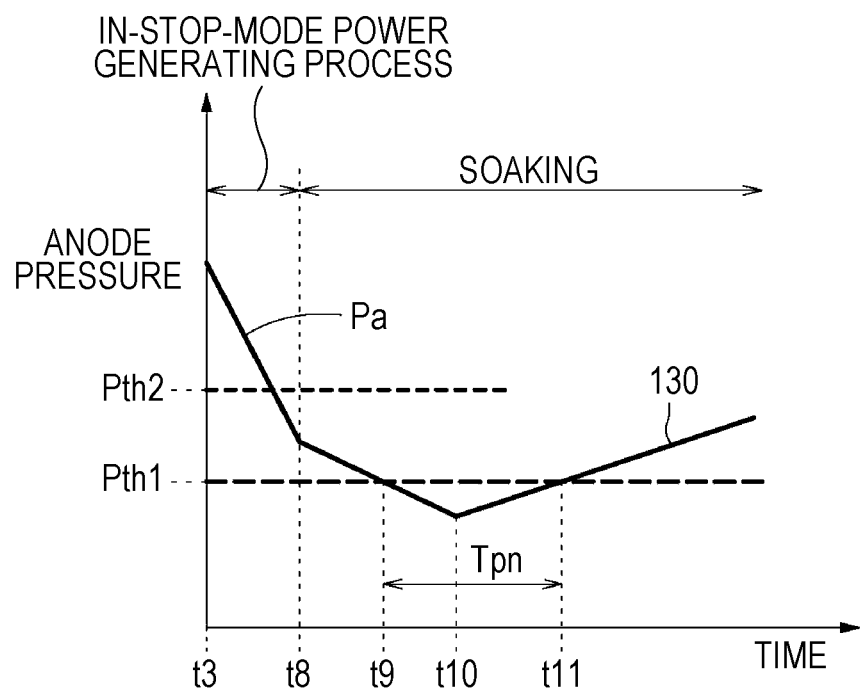
FIG. 6 is an explanatory diagram showing a change in anode pressure when the in-stop-mode power generating process is executed.

FIG. 6 illustrates a change in anode pressure Pa when the in-stop-mode power generating process is executed. A characteristic 130 showing this pressure change has been measured beforehand through experiments or the like, and stored as characteristic information, a map or the like in the memory of the controller 18.

When the shutoff valve 65 is closed at time t3 after the ignition switch is set off, the hydrogen gas is consumed by the reaction originated from the in-stop-mode power generating process, so that the anode pressure Pa in the anode circulation system (ejector 66→fuel-gas inlet hole 40a→fuel gas passage 36→fuel-gas outlet hole 40b→hydrogen circulation path 68→ejector 66) decreases comparatively quickly. It is confirmed that the anode pressure Pa at operation-stopping time t8 when the in-stop-mode power generating process is executed (time at which the FC contactor 86 is set off from the on state) is negative within a predetermined range.

During soaking at and after time t8 in FIG. 6, however, hydrogen is not consumed, and the anode pressure Pa gradually drops as indicated by the characteristics of the anode pressure Pa. When the amount of hydrogen decreases (time t10), however, the amount of the nitrogen permeating toward the anode side from the cathode side increases, so that the anode pressure Pa gradually increases (at and after time t10).

Figure 12:
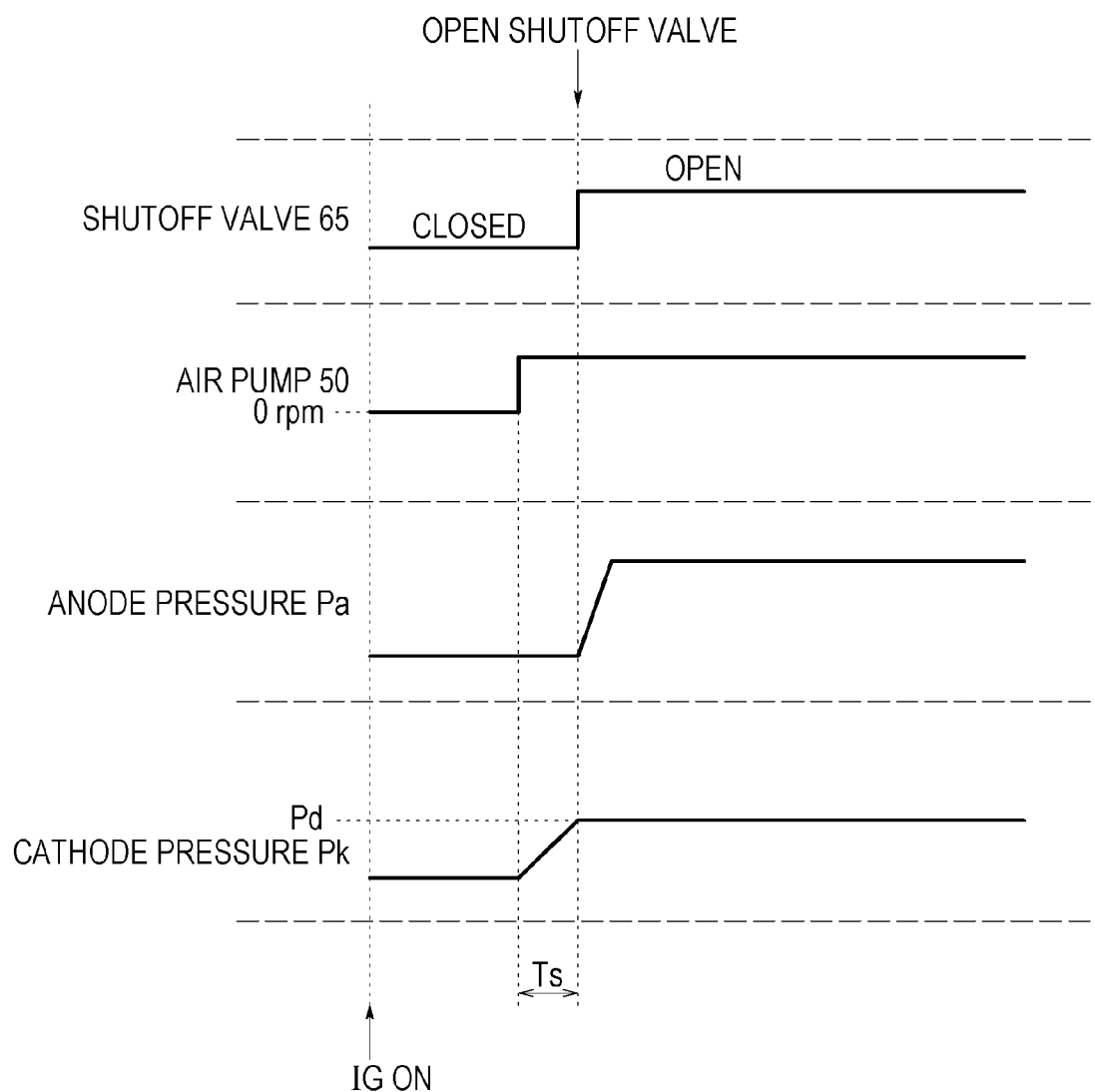
FIG. 12 is a timing chart used to explain the upon-startup air supply control process in normal mode.

A first threshold pressure Pth1 in FIG. 6 represents a threshold value which becomes equal to or higher than the inter-electrode differential pressure (Pk−Pa: the inter-electrode differential pressure is |Pk|+|Pa| because Pk is positive and Pa is negative) at which the valve body 120 shown in FIG. 3 is opened when the ignition switch (operation switch) is set on to drive the air pump 50 to supply the oxide gas to the cathode so that the cathode pressure Pk rises to a predetermined pressure Pd (see FIG. 12) according to a change in the number of rotations of the air pump 50 with the anode pressure Pa being equal to or lower than the first threshold pressure Pth1 as shown in FIG. 12.

In other words, the inter-electrode differential pressure |Pk|+|Pa| causes the valve body 120 of the air inlet valve 55 to be opened (released) against the elastic force of the spring 114 urging the valve body 120 in the valve closing direction. When the soak time is in a negative pressure protecting period Tpn from time t9 to time t11 in which the anode pressure Pa is equal to or lower than the first threshold pressure Pth1, the startup process is executed while executing an inter-electrode differential pressure protecting process (negative pressure protecting process) to be described next.

That is, when the ignition switch (operation switch) is set on in the negative pressure protecting period Tpn during soaking, the shutoff valve 65 is opened (step S1: YES) to start supplying the fuel gas from the fuel-gas supply apparatus 16 before the air pump 50 constituting the oxide-gas supply apparatus 14 is activated to start supplying the oxide gas after the ignition switch is set on (IG ON), and after a previously determined time (predetermined time) Ts1 since the start of the supply of the fuel gas (step S2: YES), the air pump 50 is driven to set cathode pressure/flow rate instructing values to the cathode pressure/flow rate for startup (step S3), and then supply of the oxide gas is started, as done in the inter-electrode differential pressure protecting process illustrated in a flowchart in FIG. 7 and by solid lines in a timing chart in FIG. 8. When the decisions in steps S1 and S2 are both negative (step S: NO, step S2: NO), the cathode pressure/flow rate instructing values are set to 0 (the number of rotations of the air pump 50 is 0) as shown in step S4.

The predetermined time Ts1 is set to a value which is sufficiently long enough for the anode pressure Pa to exceed the first threshold pressure Pth1.

Figure 7:
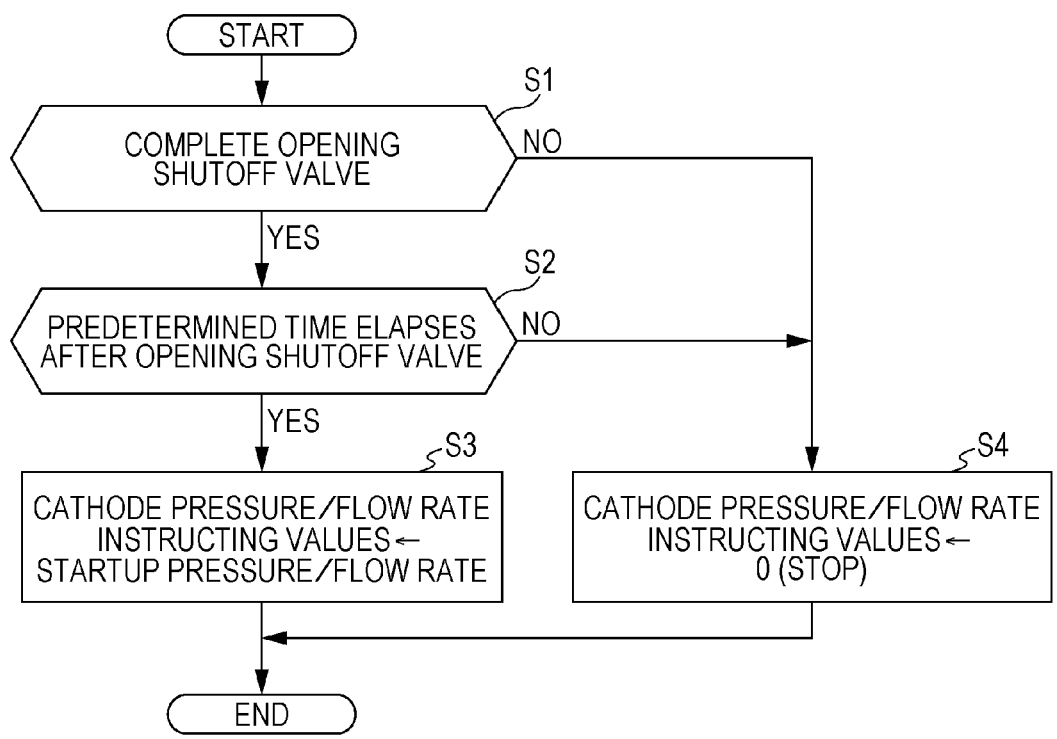
FIG. 7 is a flowchart used to explain an upon-startup air supply control process when protection of an inter-electrode differential pressure is needed.

In a case where it is determined that the anode scavenging process is needed when the outside temperature becomes a low temperature like the below-freezing temperature or is predicted to go below zero during soaking, and a case where the foregoing anode scavenging process is executed by the anode scavenging apparatus 15 as indicated by time t10' in FIG. 9 in the aforementioned period Tpn during soaking (time zone where the inter-electrode differential pressure |Pk|+|Pa| opens (releases) the valve body 120 of the air inlet valve 55 against the elastic force of the spring 114 urging the valve body 120 in the valve closing direction (see FIG. 6)), the air inlet valve 55 and the discharge valve 59 are opened to replace the gas on the anode side with air, so that the pressure on the anode side becomes the atmospheric pressure. After the anode scavenging process, therefore, the inter-electrode differential pressure protecting process which has been explained referring to FIGS. 7 and 8 is not required, so that the startup process of opening the shutoff valve 65 has only to be executed after the air pump 50 is activated at a timing indicated by a dotted line in FIG. 8 (timing in normal startup mode shown in FIG. 12).

It is confirmed that the time t10 which comes after execution of the in-stop-mode power generating process and at which the anode pressure Pa shown in FIG. 6 shifts from the pressure falling state to the pressure rising state hardly depends on the atmospheric pressure, and is determined according to the temperature and humidity of the solid polymer electrolyte membrane 22. That is, the time t10 at which the anode pressure Pa shifts from the pressure falling state to the pressure rising state comes after a short soak time Tsa from the operation stopping time t8 (at which the FC contactor 86 is set off from the on state) the solid polymer electrolyte membrane 22 has higher temperature and higher humidity (WET), and falls within a long soak time Tsd from the operation stopping time t8 as the solid polymer electrolyte membrane 22 has lower temperature and humidity (DRY).

Figure 8:
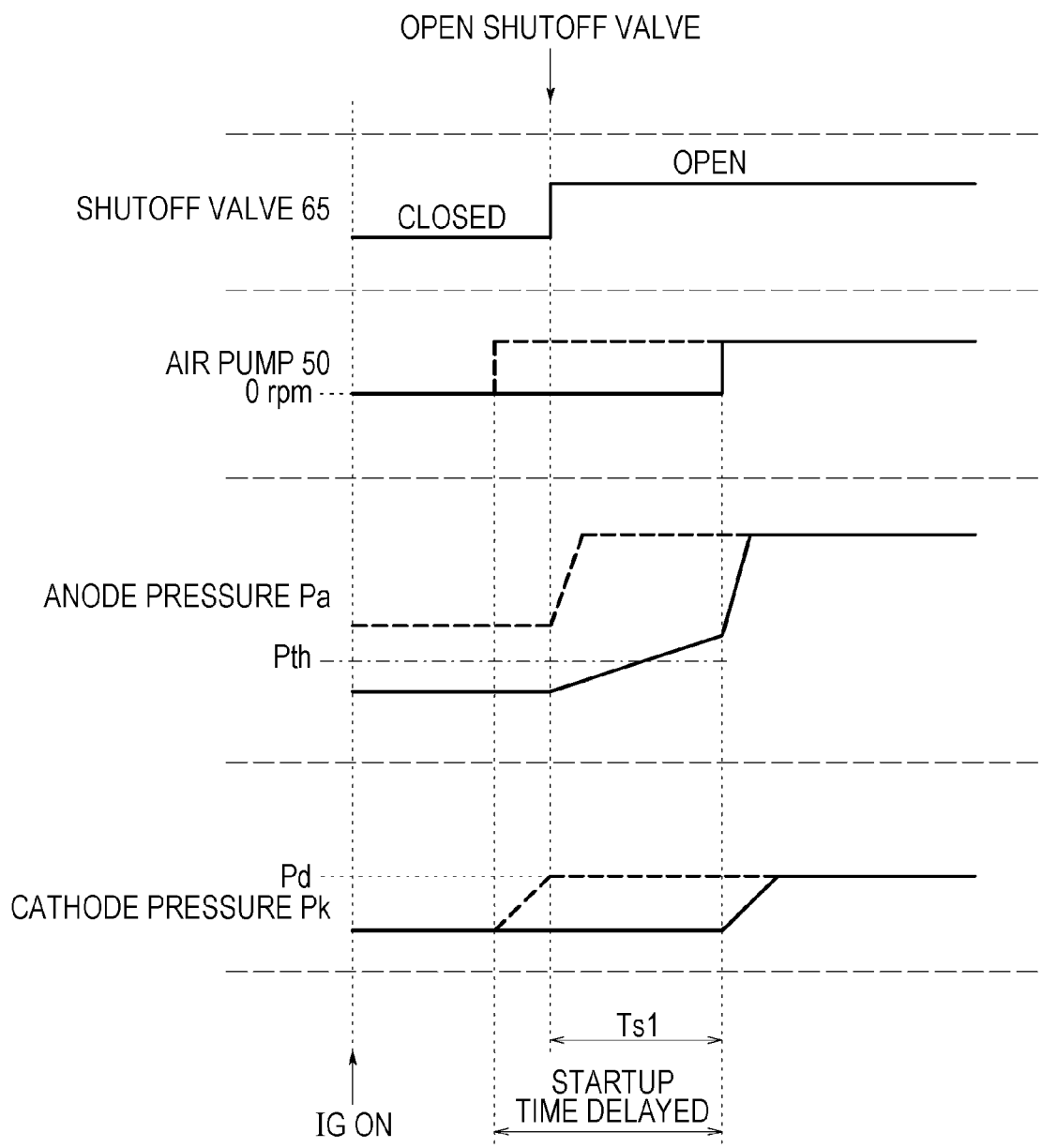
FIG. 8 is a timing chart used to explain the upon-startup air supply control process when protection of the inter-electrode differential pressure is needed.
Figure 9:
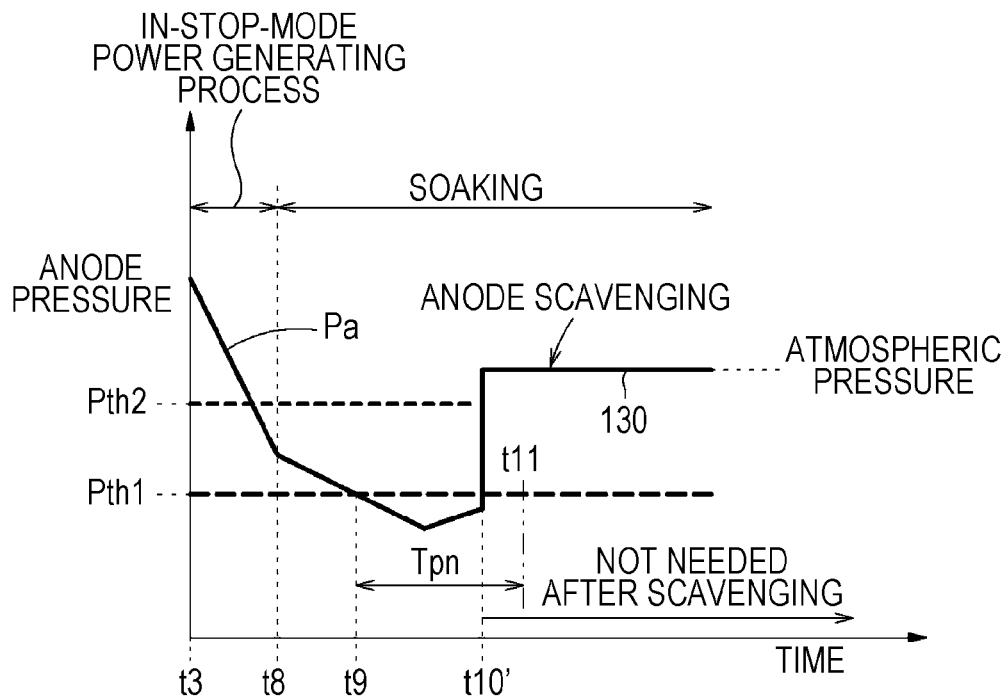
FIG. 9 is an explanatory diagram showing a change in anode pressure when an anode scavenging process is executed during soaking after execution of the in-stop-mode power generating process.
Figure 11:
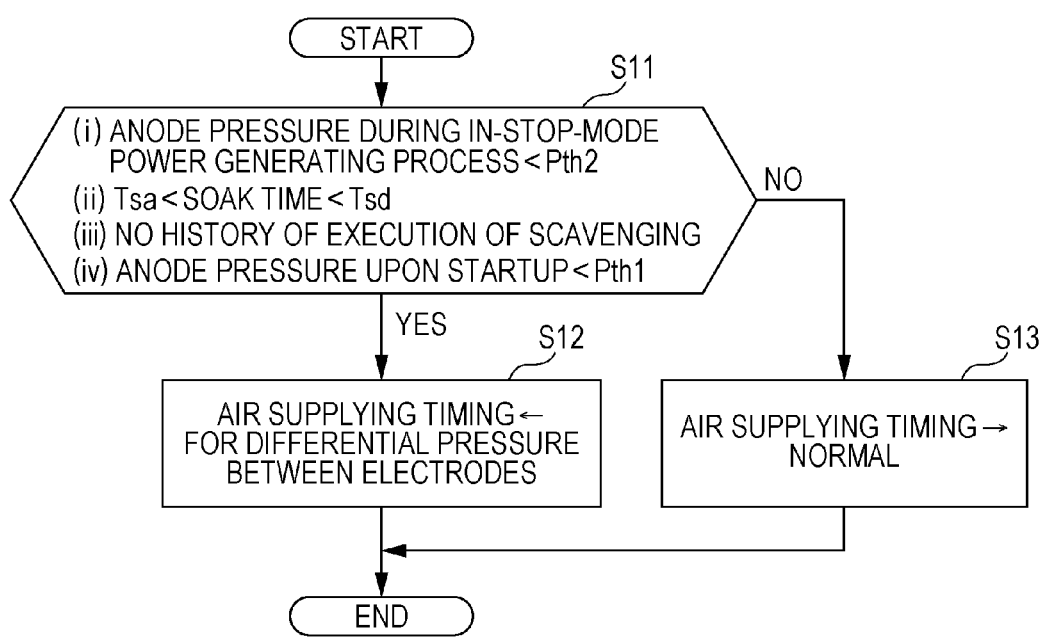
FIG. 11 is an explanatory diagram showing the correlation between decision on whether protection of the inter-electrode differential pressure is needed and the air supply control process.

Accordingly, when four conditions (i) that the anode pressure Pa during the in-stop-mode power generating process is a predetermined pressure Pth2 (lower limit of the measuring range of the anode pressure sensor 102 in this example: the sensor output would overflow if the anode pressure becomes a lower pressure (negative pressure) than that pressure (both pressures being negative and |Pth2|<|Pth1|), (ii) the soak time is longer the soak time Tsa and shorter than the soak time Tsd, (iii) there is no history of execution of the anode scavenging process, and (iv) the upon-startup anode pressure Pa is equal to or lower than Pth1 are fulfilled in a decision of step S11 as illustrated in a flowchart in FIG. 11, an air supplying timing illustrated in step S12 is regarded as the timing for the inter-electrode differential pressure protection (timing indicated by a solid line in FIG. 8). When at least one of the four conditions is not met, air is supplied at a normal timing (timing indicated by a dotted line in FIG. 8).

Overview of the Embodiment

As described above, the startup control method for the fuel cell system 10 according to the foregoing embodiment includes the fuel cells 20 that each generate power according to an electrochemical reaction of an oxide gas supplied to the cathode side with a fuel gas supplied to the anode side, the oxide-gas supply apparatus 14 that supplies the oxide gas to the fuel cell 20, and the fuel-gas supply apparatus 16 that supplies the fuel gas to the fuel cells.

Upon detection of the operation stop instruction to stop the operation of the fuel cell 20, the controller 18 (control unit, control means) executes the in-stop-mode power generating process of stopping supply of the fuel gas, and supplying the oxide gas to the fuel cell 20 to generate power therefrom, and then stopping power generation of the fuel cells. Upon detection of the operation start instruction to start the fuel cell system after the power generation is stopped after execution of the in-stop-mode power generating process, the controller 18 executes the first startup process (see FIG. 8) of starting supplying the fuel gas from the fuel-gas supply apparatus 16 before starting supplying the oxide gas from the oxide-gas supply apparatus 14, and starting supplying the oxide gas after elapsing of the predetermined time Ts1 from the start of supply of the fuel gas, when the anode pressure Pa of the fuel cell 20 is equal to or lower than the first threshold pressure Pth1 (which is measured by the pressure sensor 102 having, for example, a wide measuring range on the negative pressure side to enable measurement of the first threshold pressure Pth1 in this case). Accordingly, the fuel cell system 10 can be started without raising the inter-electrode differential pressure between the anode and the cathode (with the inter-electrode differential pressure being reduced), making it possible to prevent erroneous opening or the like of the air inlet valve 55, the discharge valve 59 and the purge valve 72 which allow the anode and the cathode to communicate with each other outside the fuel cell 20. The "inter-electrode differential pressure" used herein means the differential pressure between the pressure on the cathode side which is the same as the atmospheric pressure and the pressure on the anode side.

Even when the pressure sensor 102 has a narrow negative-pressure side measuring range where the first threshold pressure Pth1 cannot be measured, in the case where the anode pressure Pa when power generation of the fuel cell 20 is stopped after execution of the in-stop-mode power generating process is equal to or lower than the second threshold pressure Pth2 (the lower limit of the negative pressure measured by the pressure sensor 102 according to the specifications in the embodiment) and the time elapsed since stopping of power generation of the fuel cell 20 lies within the specified time range (time range from time t9 to time t11 in FIG. 6 in which startup with inter-electrode differential pressure protection is needed), the second startup process (FIGS. 6 and 8) of starting supplying the fuel gas from the fuel-gas supply apparatus 16 before starting supplying the oxide gas from the oxide-gas supply apparatus 14, and starting supplying the oxide gas after the predetermined time Ts1 elapses from a point of time when supply of the fuel gas has started. Even if the pressure sensor 102 has a narrow negative-pressure side measuring range where the first threshold pressure Pth1 cannot be measured, therefore, the point of starting supply of the fuel gas can be predicted by monitoring the elapsed time, and the fuel cell system 10 can be started without raising the inter-electrode differential pressure between the anode and the cathode (with the inter-electrode differential pressure being reduced), making it possible to prevent erroneous opening of the air inlet valve 55, the discharge valve 59 and the purge valve 72 which allow the anode and the cathode to communicate with each other outside the fuel cell 20.

In this case, upon detection of the operation start instruction to start the fuel cell system 10 after stopping power generation of the fuel cell 20 after execution of the in-stop-mode power generating process, in the case where the anode pressure Pa when power generation of the fuel cell 20 is stopped after execution of the in-stop-mode power generating process is equal to or lower than the second threshold pressure Pth2 and the anode scavenging apparatus 15 is operated at a time (time t10' in the embodiment) before the time elapsed since stopping of power generation of the fuel cell 20 enters the specified time range from time t9 to time t11, the anode pressure Pa has increased up to the atmospheric pressure, eliminating the need to execute the second startup process. Therefore, the second startup process is stopped, and the third startup process (normal startup process indicated by the dotted line in FIG. 8) of starting supplying the oxide gas from the oxide-gas supply apparatus 14 earlier than starting supplying the fuel gas from the fuel-gas supply apparatus 16 is executed. Accordingly, the startup process to start the fuel cell system 10 after execution of the in-stop-mode power generating process can be carried out promptly.

Figure 10:
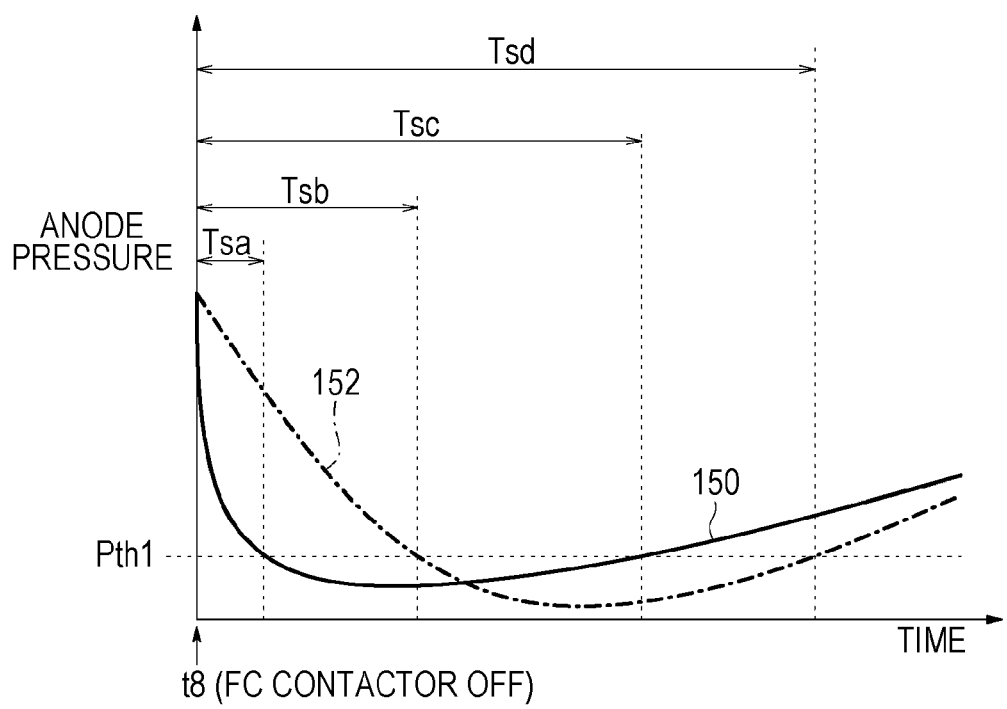
FIG. 10 is an explanatory diagram used to explain a factor which causes the anode pressure to shift from a pressure falling state to a pressure rising state after execution of the in-stop-mode power generating process.

Based on the characteristics 150, 152 that have been determined beforehand in consideration of the temperature and humidity of the anode when power generation of the fuel cell 20 is stopped after execution of the in-stop-mode power generating process, the time Tsa, Tsb (see FIG. 10) before the elapsed time enters the specified time may be set in such a way that the time Tsa set for high temperature and high humidity (characteristic 150) is set shorter than the time Tsb set for low temperature and low humidity.

The fuel cell system 10 may further include the anode scavenging apparatus 15 that includes the air inlet valve 55 or the scavenging valve which has the input port 124 communicating with the air pump 50, and the output port 128 communicating with the anode side of the fuel cell 20, and may supply compressed air as a scavenging gas to the anode side from the air pump 50 via the input port 124 and output port 128 of the air inlet valve 55 to scavenge the anode. The air inlet valve 55 preferably has the valve body 120 which is closed by elastic force of the spring 114 and is opened by electromagnetic force greater than the elastic force.

The disclosure is not limited to the foregoing embodiment, and may take various configurations based on the contents of the present specification.

According to one aspect of an exemplary embodiment, there is provided a control method for a fuel cell system having a fuel cell that generates power according to an electrochemical reaction of an oxide gas supplied to a cathode side with a fuel gas supplied to an anode side, an oxide-gas supply apparatus that supplies the oxide gas to the fuel cell, and a fuel-gas supply apparatus that supplies the fuel gas to the fuel cell. The control method includes, upon detection of an operation stop instruction to stop an operation of the fuel cell, executing an in-stop-mode power generating process of stopping supply of the fuel gas, and supplying the oxide gas to the fuel cell to generate power therefrom, and then stopping power generation of the fuel cell, and upon detection of an operation start instruction to start the fuel cell system after the power generation is stopped after execution of the in-stop-mode power generating process, executing a first startup process of starting supplying the fuel gas from the fuel-gas supply apparatus before starting supplying the oxide gas from the oxide-gas supply apparatus, and starting supplying the oxide gas after elapsing of a predetermined time from the start of supply of the fuel gas, when a pressure of the anode is equal to or lower than a first threshold pressure.

According to this aspect, upon detection of the operation start instruction to start the fuel cell system after the power generation is stopped after execution of the in-stop-mode power generating process, when the pressure of the anode is equal to or lower than the first threshold pressure, the first startup process of starting supplying the fuel gas from the fuel-gas supply apparatus before starting supplying the oxide gas from the oxide-gas supply apparatus, and starting supplying the oxide gas after elapsing of the predetermined time from the start of supply of the fuel gas. Accordingly, the fuel cell system can be started without raising the inter-electrode differential pressure between the anode and the cathode (with the inter-electrode differential pressure being reduced), making it possible to prevent erroneous opening or the like of the air inlet valve which allows the anode and the cathode to communicate with each other outside the fuel cell. The "inter-electrode differential pressure" used herein means the differential pressure between the pressure on the cathode side which is the same as the atmospheric pressure and the pressure on the anode side.

According to another aspect of the embodiment, there is provided a control method for a fuel cell system having a fuel cell that generates power according to an electrochemical reaction of an oxide gas supplied to a cathode side with a fuel gas supplied to an anode side, an oxide-gas supply apparatus that supplies the oxide gas to the fuel cell, and a fuel-gas supply apparatus that supplies the fuel gas to the fuel cell. The control method includes, upon detection of an operation stop instruction to stop an operation of the fuel cell, executing an in-stop-mode power generating process of stopping supply of the fuel gas, and supplying the oxide gas to the fuel cell to generate power therefrom, and then stopping power generation of the fuel cell, and upon detection of an operation start instruction to start the fuel cell system after the power generation is stopped after execution of the in-stop-mode power generating process, executing a second startup process of starting supplying the fuel gas from the fuel-gas supply apparatus before starting supplying the oxide gas from the oxide-gas supply apparatus, and starting supplying the oxide gas after a predetermined time elapses from a point of time when supply of the fuel gas has started, in a case where a pressure of the anode when power generation of the fuel cell is stopped after execution of the in-stop-mode power generating process is equal to or lower than a second threshold pressure and a time elapsed since stopping of power generation of the fuel cell lies within a specified time.

According to this aspect, upon detection of the operation start instruction during soaking after the power generation of the fuel cell is stopped, when the anode pressure is equal to or lower than the second threshold pressure (e.g., the range of the lower limit of measurement of the anode pressure sensor according to the embodiment) and the time elapsed since the stopping of the power generation of the fuel cell lies within the range of the specified time (e.g., the time range in which protection against negative pressure upon startup is needed), the second startup process of starting supplying the fuel gas from the fuel-gas supply apparatus before starting supplying the oxide gas from the oxide-gas supply apparatus, and starting supplying the oxide gas after elapsing of the predetermined time from the start of the supply of the fuel gas. This makes it possible to start the fuel cell system without raising the inter-electrode differential pressure between the anode and the cathode (with the inter-electrode differential pressure being reduced), thereby preventing erroneous opening or the like of the air inlet valve which allows the anode and the cathode to communicate with each other outside the fuel cell.

The control method according to the first aspect of the embodiment can be carried out by using, for example, a pressure sensor having a wide pressure measuring range on the negative pressure side where it is possible to measure whether or not the anode pressure of the fuel cell is equal to or lower than the first threshold pressure (the range of the lower limit of measurement of the anode pressure sensor). The control method according to the second aspect of the embodiment is advantageous over the control method according to the first aspect in that the point of starting supplying the fuel gas can be predicted under the time condition that the time elapsed since stopping of the power generation of the fuel cell lies within the specified time range (e.g., the time range in which protection against negative pressure upon startup is needed), without providing such a pressure sensor having a wide pressure measuring range on the negative pressure side (the range of the of the anode pressure sensor).

In this case, the fuel cell system may further include an anode scavenging apparatus that supplies a scavenging gas to the anode side of the fuel cell to scavenge the anode, and upon detection of the operation start instruction to start the fuel cell system after stopping power generation of the fuel cell after execution of the in-stop-mode power generating process, the second startup process may be stopped, and a third startup process of starting supplying the oxide gas from the oxide-gas supply apparatus earlier than starting supplying the fuel gas from the fuel-gas supply apparatus may be executed, in a case where the pressure of the anode when power generation of the fuel cell is stopped after execution of the in-stop-mode power generating process is equal to or lower than the second threshold pressure and the anode scavenging apparatus is operated before the time elapsed since stopping of power generation of the fuel cell enters the specified time.

In this case, upon detection of the operation start instruction to start the fuel cell system after stopping power generation of the fuel cell after execution of the in-stop-mode power generating process, in the case where the pressure of the anode when power generation of the fuel cell is stopped after execution of the in-stop-mode power generating process is equal to or lower than the second threshold pressure and the anode scavenging apparatus is operated before the time elapsed since stopping of power generation of the fuel cell enters the specified time, the anode pressure is increased, eliminating the need to execute the second startup process, so that the second startup process is stopped, and the third startup process (normal startup process) of starting supplying the oxide gas from the oxide-gas supply apparatus earlier than starting supplying the fuel gas from the fuel-gas supply apparatus is executed. This makes it possible to quickly execute the startup process at the time of startup after the in-stop-mode power generating process is executed.

The time before the elapsed time enters the specified time may be set shorter for a case of high temperature and high humidity than that for a case of low temperature and low humidity, based on characteristics determined beforehand in consideration of a temperature and humidity of the anode when power generation of the fuel cell is stopped after execution of the in-stop-mode power generating process.

The fuel cell system may further include an anode scavenging apparatus that includes a scavenging valve having an input port communicating with an air pump, and an output port communicating with the anode side of the fuel cell, and may supply a scavenging gas to the anode side from the air pump via the input port and output port of the scavenging valve to scavenge the anode. The scavenging valve preferably has a valve body which is closed by elastic force and is opened by electromagnetic force greater than the elastic force.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell, the method comprising:

an in-stop-mode power generating process of, when an operation stop instruction to stop an operation of the fuel cell is detected, stopping supply of the fuel gas from the fuel-gas supply apparatus to the fuel cell, supplying the oxide gas to the fuel cell to generate power from the oxide-gas supply apparatus, and stopping power generation of the fuel cell; and a first startup process performed when a pressure of the anode side is equal to or lower than a first threshold pressure of, when an operation start instruction to start the fuel cell system is detected after the in-stop-mode power generating process, starting supplying the fuel gas from the fuel-gas supply apparatus to the fuel cell, and starting supplying the oxide gas from the oxide-gas supply apparatus after the starting of supply of the fuel gas.

2. The method according to claim 1, wherein the fuel cell system further comprises an anode scavenging apparatus including a scavenging valve, the scavenging valve having an input port, an output port, and a valve body, the input port communicating with an air pump, the output port communicating with the anode side of the fuel cell, the valve body being provided to be closed by elastic force and to be opened by electromagnetic force greater than the elastic force, the anode scavenging apparatus being to supply a scavenging gas to the anode side from the air pump via the input and output ports of the scavenging valve to scavenge the anode side.

3. The method according to claim 2, wherein
the first threshold pressure is set equal to or higher than an inter-electrode differential pressure at which the scavenging valve is opened against the elastic force without the electromagnetic force.

4. A method for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell, the method comprising:

an in-stop-mode power generating process of, if an operation stop instruction to stop an operation of the fuel cell is detected, stopping supply of the fuel gas from the fuel-gas supply apparatus to the fuel cell, supplying the oxide gas to the fuel cell to generate power from the oxide-gas supply apparatus, and stopping power generation of the fuel cell; and a second startup process performed when a pressure of the anode side when the power generation of the fuel cell is stopped is equal to or lower than a second threshold pressure and a time elapsed since stopping of power generation of the fuel cell lies within a specified time of, when an operation start instruction to start the fuel cell system is detected after the in-stop-mode power generating process, starting supplying the fuel gas from the fuel-gas supply apparatus to the fuel cell before starting supplying the oxide gas from the oxide-gas supply apparatus, and starting supplying the oxide gas after starting of supply of the fuel gas.

5. The method according to claim 4, wherein
the fuel cell system further comprises an anode scavenging apparatus to supply a scavenging gas to the anode side of the fuel cell to scavenge the anode side, and
if the operation start instruction to start the fuel cell system is detected after the in-stop-mode power generating process, the second startup process is stopped, and a third startup process of starting supplying the oxide gas from the oxide-gas supply apparatus earlier than starting supplying the fuel gas from the fuel-gas supply apparatus is executed, in a case where the pressure of the anode side after the in-stop-mode power generating process is equal to or lower than the second threshold pressure and the anode scavenging apparatus is operated before the specified time elapses since the stopping of the power generation of the fuel cell.

6. The method according to claim 4, wherein
the specified time is set based on characteristics determined beforehand in consideration of a temperature and humidity of the anode side when the power generation of the fuel cell is stopped in the in-stop-mode power generating process, and
the specified time under high temperature and high humidity is set shorter than the specified time under low temperature and low humidity.

7. The method according to claim 6, wherein the fuel cell system further comprises an anode scavenging apparatus including a scavenging valve, the scavenging valve having an input port, an output port, and a valve body, the input port communicating with an air pump, the output port communicating with the anode side of the fuel cell, the valve body being provided to be closed by elastic force and to be opened by electromagnetic force greater than the elastic force, the anode scavenging apparatus being to supply a scavenging gas to the anode side from the air pump via the input and output ports of the scavenging valve to scavenge the anode side.

8. The method according to claim 4, wherein the fuel cell system further comprises an anode scavenging apparatus including a scavenging valve, the scavenging valve having an input port, an output port, and a valve body, the input port communicating with an air pump, the output port communicating with the anode side of the fuel cell, the valve body being provided to be closed by elastic force and to be opened by electromagnetic force greater than the elastic force, the anode scavenging apparatus being to supply a scavenging gas to the anode side from the air pump via the input and output ports of the scavenging valve to scavenge the anode side.

9. The method according to claim 4, wherein
the fuel cell system further comprises a pressure sensor configured to detect the pressure of the anode side, and
the second threshold pressure is set at a lower limit of a measuring range of the pressure sensor.

10. The method according to claim 1, wherein the starting supplying the oxide gas from the oxide-gas supply apparatus is performed after a predetermined time that is sufficiently long for the pressure of the anode side to become greater than the first threshold pressure.

11. The method according to claim 1, further comprising:
measuring the pressure of the anode side with a pressure sensor to determine a measured pressure; and
determining whether the measured pressure is equal to or lower than the first threshold pressure, wherein
the first startup process is performed only when the measured pressure is equal to or lower than the first threshold pressure.

12. The method according to claim 11, wherein
the fuel cell system further comprises an anode scavenging apparatus including a scavenging valve, and
the first threshold pressure is equal to or higher than an opening pressure that is sufficient to open the scavenging valve.

13. The method according to claim 4, further comprising:
measuring the pressure of the anode side with a pressure sensor to determine a measured pressure; and
determining whether the measured pressure is equal to or lower than the first threshold pressure, wherein
the first startup process is performed only when the measured pressure is equal to or lower than the second threshold pressure and the time elapsed since stopping of power generation of the fuel cell lies within the specified time.

14. The method according to claim 13, wherein
the fuel cell system further comprises an anode scavenging apparatus including a scavenging valve, and
the first threshold pressure is equal to or higher than an opening pressure that is sufficient to open the scavenging valve.

* * * * *